July 19, 1949.  E. KENDALL  2,476,667
TRUCK LOADING SHOVEL

Filed Aug. 21, 1946  3 Sheets-Sheet 1

INVENTOR.
EDWARD KENDALL,
BY *Victor J. Evans & Co.*
ATTORNEYS

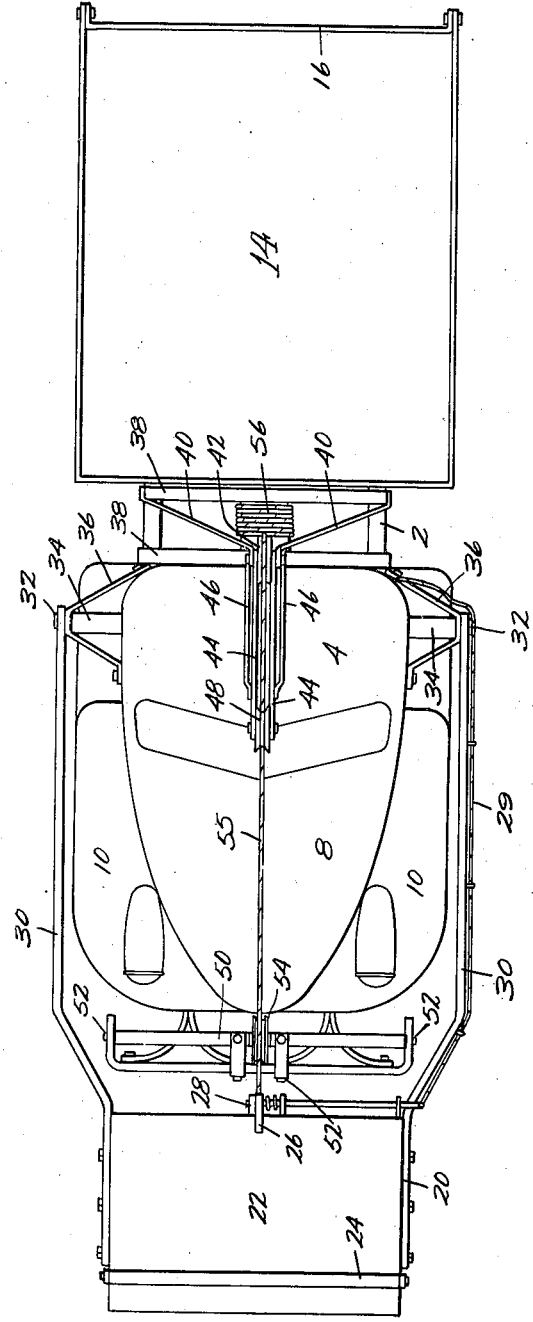

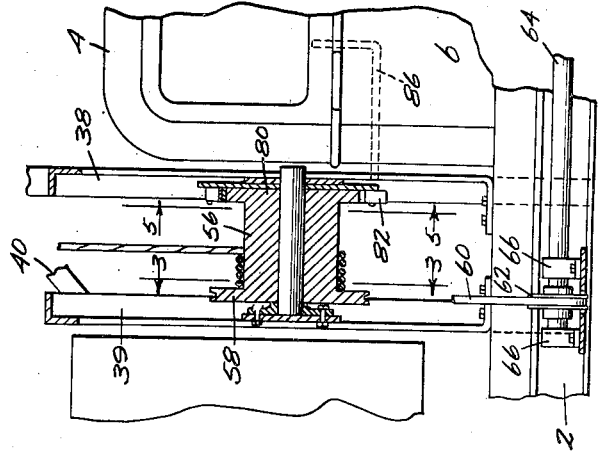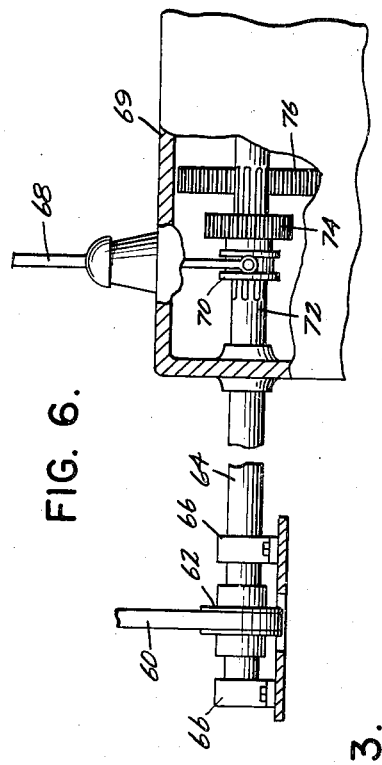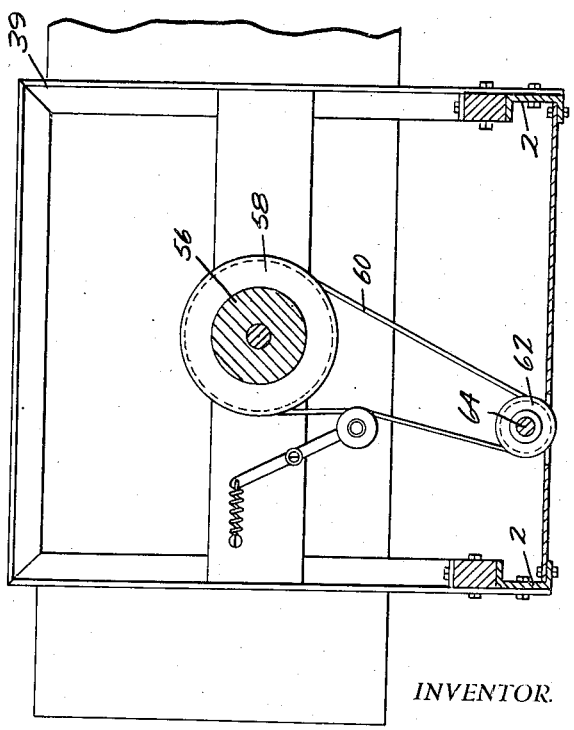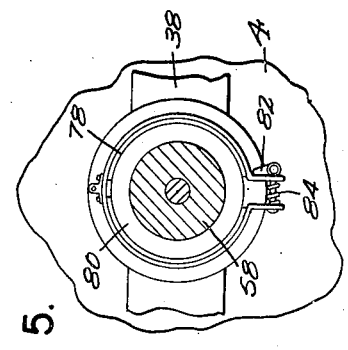

Patented July 19, 1949

2,476,667

UNITED STATES PATENT OFFICE 2,476,667

TRUCK LOADING SHOVEL

Edward Kendall, Evanston, Wyo.

Application August 21, 1946, Serial No. 692,013

1 Claim. (Cl. 214—78)

My present invention relates to an improved truck loading shovel and more particularly to a power operated shovel including a novel combination and arrangement of parts wherein a single one-way powered windlass will elevate the loaded shovel to dumping position and will lower the unloaded shovel to loading position.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 2 is a top plan view thereof.

Figure 3 is a vertical sectional view transversely through the hoist showing the drive means therefor.

Figure 4 is a longitudinal vertical sectional view thereof.

Figure 5 is a view of the brake for the windlass.

Figure 6 is a view of the power take-off means.

Figure 1:
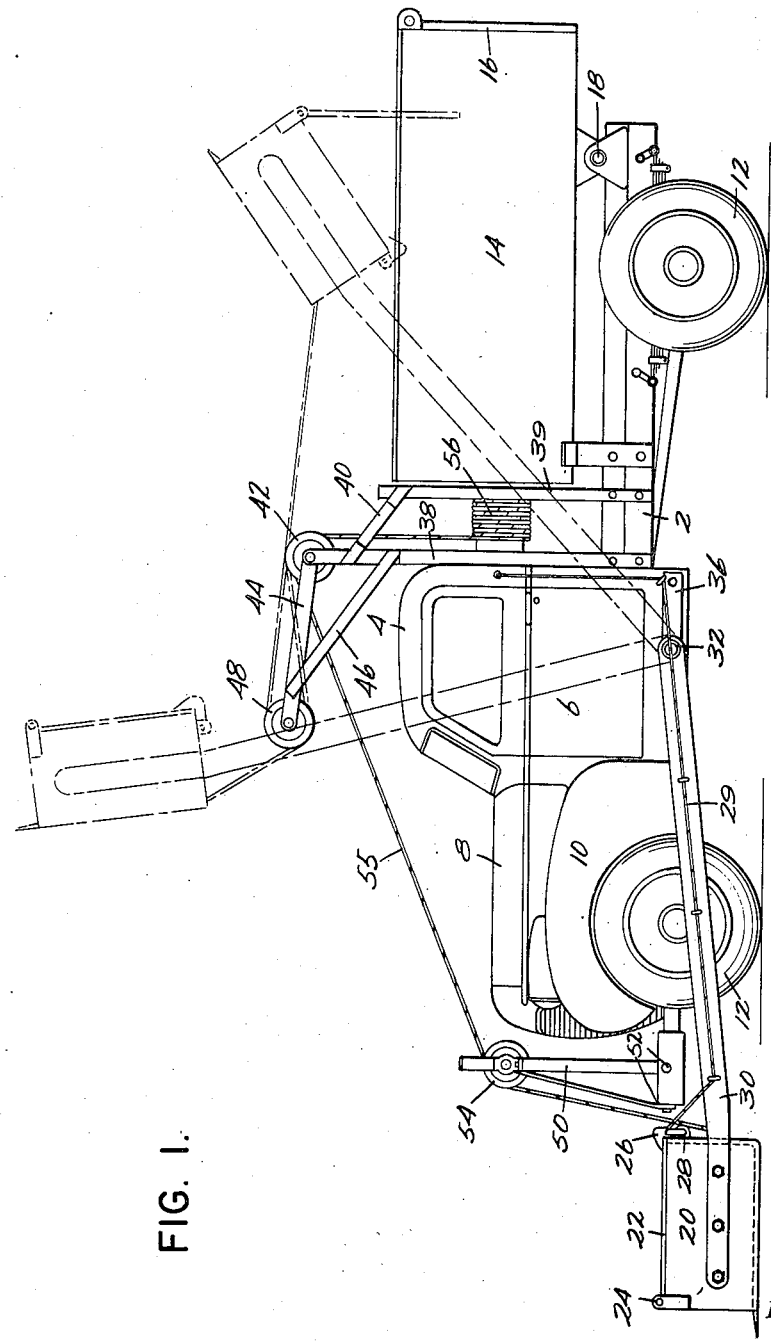
Figure 1 is a side elevational view of a truck embodying the shovel of my invention.

Referring now to the drawings in detail wherein like characters indicate like parts, I have illustrated a conventional truck having a frame 2 upon which is mounted the cab 4 with its door 6, and forward of the cab I have shown the hood 8 and fenders 10 covering the wheels 12.

Rearward of the cab I have shown a dump body 14 having a rear gate 16, and the dump body is pivotally mounted as at 18 on the truck frame 2.

Forward of the truck I have illustrated the shovel 20 substantially rectangular in shape and having a scoop 21 with a gate 22 pivoted at 24 on the shovel. A latch 26 is journaled as at 28 on the rear wall of the shovel and the line 29 runs to the cab for manual operation of the latch by the driver to release the gate 22 and dump the contents of the shovel.

The arms 30 are secured to the sides of the shovel and are journaled rearwardly as at 32 on the shaft 34 which is braced at 36.

Between the rear of the cab and the dump body I have provided supporting frames 38 and 39 braced as at 40 and carrying the sheave 42 in rotatable position. Forward of the frame 38 are the extended arms 44 diagonally braced as at 46 and having journaled therebetween the sheave 48. As best seen in Figure 1 this latter sheave 48 is substantially forward and slightly above the rear sheave 42 as will be hereinafter described.

A frame 50 is secured on the front of the truck as at 52 and carries therein a sheave 54. Rope or cable 55 is attached to the shovel 20, passes over the sheave 54, over the sheave 42 and downward to the windlass or hoist drum 56. The drum 56 is provided with a grooved wheel 58 attached thereto and a belt 60 provides motion to the drum from the drive wheel 62 on the power take-off shaft 64 journaled at 66. A lever 68 located in the cab 4 on the housing 69 is operably connected with the collar 70 slidable on the splined portion 72 of the shaft 64 to engage or disengage as the case may be, the pinion 74 from the gear 76.

A brake shoe 78 operates on the end of the disk 80, a part of the hoist drum 56, and is controlled by movement of the cam 82 against the spring 84 by means of the lever 86 in the cab.

In operation, with the shovel in forward lowered position as seen in Figure 1, the truck is driven forward to move the shovel into the material to be moved. When the shovel is loaded, the lever 68 is moved to position to power the drum and the rope 55 is wound thereon. The arms 30 thus swing upwards on their journals 32 and pass over the cab.

However, as the arms approach a vertical position, the rope 55 will engage the sheave 48 and at that point the operator will move the lever 68 to disengaging position to allow the momentum of the shovel and its arm to pass over the top dead center of the arcuate movement, and the weight of the shovel will unwind the de-clutched hoist whereupon the operator will apply the brake shoe 78 to control the downward movement of the shovel. When in dumping position, the latch 26 is tripped by the rope 29 and the shovel emptied.

To return the shovel to loading position, the lever 68 is moved to engaging position and the drum will wind the rope 55 over the sheave 48 until the arc of the movement removes the rope from the sheave at which point the lever 68 is again disengaged and the brake applied. The motion then is repeated with the hoist drum doing double duty due to the placement of the successively operating sheaves 42 and 48.

It will be apparent from the above description of the construction and operation, that the shovel of my invention with the operating means therefor is simple to use requiring only the two control levers, and costly, and intricate reversing mechanisms for the hoist have been eliminated.

Having thus fully described my invention what I claim as new and desire to secure by Letters Patent is:

In combination a truck having a dump body and a cab forwardly spaced therefrom, a truck loading shovel having side arms pivotally connected at their rearward ends to the cab and adapted to be extended upwardly and rearwardly thereof, supporting frames disposed on the truck between the cab and the truck body, arms extending forwardly from the supporting frames and over the cab, said supporting frame and the arms having respectively longitudinally aligned sheaves, a frame extending forwardly from the truck and in front of the cab and having a sheave pivoted thereon to lie above the forward end of the cab, a drum on the supporting frames between the dump body and the cab, a cable extending from the drum and over the sheave on the supporting frame, the sheave on the frame on the front of the truck and connected to the truck loading shovel to lift the same, said truck having power means for operating the drum whereby to lift the truck loading shovel and said sheave on the forwardly extending arms being adapted to receive the cable upon the truck loading shovel reaching a point over the top of the cab and being extended toward the dump truck body, the cable remaining upon the sheave of the supporting frame throughout the complete rearward movement of the truck loading shovel, the cable resisting means associated with the drum and operable as the truck loading shovel passes over the cab to be lowered toward the dump body to unload its contents.

EDWARD KENDALL.

REFERENCES CITED

The following references are of record in the file of this patent:

UNITED STATES PATENTS

| Number | Name | Date |
|---|---|---|
| 1,301,643 | Blank | Apr. 22, 1919 |
| 1,337,332 | Sills | Apr. 20, 1920 |
| 1,892,243 | Lambert | Dec. 27, 1932 |
| 2,182,781 | Andersen et al. | Dec. 12, 1939 |
| 2,327,473 | Wagner et al. | Aug. 24, 1943 |